United States Patent [19]

Anderson et al.

[11] Patent Number: 4,597,175
[45] Date of Patent: Jul. 1, 1986

[54] METHOD FOR MAKING INFRARED DETECTOR DEWAR

[75] Inventors: David A. K. Anderson, Irvine; James B. Gilpin, San Juan Capistrano; Melvin J. Kniffin, Costa Mesa, all of Calif.

[73] Assignee: Ford Aerospace & Communications Corporation, Detroit, Mich.

[21] Appl. No.: 689,906

[22] Filed: Jan. 8, 1985

Related U.S. Application Data

[62] Division of Ser. No. 522,439, Aug. 10, 1983, Pat. No. 4,565,925.

[51] Int. Cl.$^4$ ............................................. H01R 43/00
[52] U.S. Cl. ...................................... 29/827; 29/841; 29/856
[58] Field of Search ................... 250/352, 349; 29/827, 29/841, 856, 855, 848; 65/59.2, 59.26, 59.27, 59.28

[56] References Cited

U.S. PATENT DOCUMENTS

| | | | |
|---|---|---|---|
| 3,719,990 | 3/1973 | Long et al. .......................... 29/841 |
| 4,005,288 | 1/1977 | Robillard . | |
| 4,206,354 | 6/1980 | Small, Jr. ......................... 29/856 X |
| 4,487,037 | 12/1984 | Meignin et al. ................. 250/352 X |
| 4,491,729 | 1/1985 | Stahl et al. ...................... 250/352 X |

FOREIGN PATENT DOCUMENTS 4324687 10/1968 Japan .................................... 65/59.2

Primary Examiner—Howard N. Goldberg
Assistant Examiner—Carl J. Arbes
Attorney, Agent, or Firm—Edward J. Radlo; Keith L. Zerschling; Harry G. Weissenberger

[57] ABSTRACT

A vacuum dewar for infrared detectors is disclosed, in which unitary Kovar leads are used to reduce heat load and improve reliability and ruggedness. The Kovar leads are encapsulated in the glass walls of the hollow stem which carries the sensor array and supplies cryogenic fluid for cooling the array. The Kovar leads extend throughout the entire length of the stem to form both the electrical feed-through and the contact points at each end of the stem for the attachment of wire leads or cables, and to form a reinforcing structure for the stem. A fabrication method is also disclosed, in which a unitary Kovar leadframe is held under tension while two concentric glass tubes, between which the leadframe is vacuum-sandwiched, are fused together to form a stem encapsulating continuous Kovar leads throughout its length, while preventing excessive oxidation of the Kovar leads.

3 Claims, 12 Drawing Figures

METHOD FOR MAKING INFRARED DETECTOR DEWAR

This is a divisional application of application Ser. No. 522,439 filed Aug. 10, 1983, now U.S. Pat. No. 4,565,925 issued Jan. 21, 1986.

FIELD OF THE INVENTION

This invention relates to dewars for infrared detectors operated at extremely low temperatures, and more particularly to an improved structure and method for electrically interconnecting the infrared detector with the outside world.

BACKGROUND OF THE INVENTION

Certain types of infrared detectors are designed to operate at extremely low temperatures. For this purpose, focal plane arrays consisting of many individual sensors are typically mounted on the closed end of a glass conduit into which liquid nitrogen, cryostats or cryocooler systems are introduced. Because frost formation on the detector tube's window would destroy the detector's ability to see, and to provide the required cryogenic temperature at the detector array with ambient temperature electrical interconnects to the outside world, it is necessary to thermally insulate the cooled array from the outside world by enclosing the detector in a dewar at a high vacuum. The window through which infrared radiation impinges on the sensor array is part of the envelope of the dewar, and the cooled portion of the dewar consists of the detector-bearing cryogenic fluid conduit or stem which protrudes into the dewar's envelope opposite the window. A critical problem area with all dewars is the method used to route the electrical connections across the temperature gradient between the detector and the outside world, and through the evacuated envelope.

Because each sensor of the sensor array needs to be separately connected to the outside world, it is necessary to bring a very large number of leads (on the order of fifty to a hundred) out from the dewar in a very small space. Typically, the stem, on which the electrical conductors or leads are usually mounted, has a diameter of less than one centimeter and a length on the order of six to seven centimeters.

Where the conductors have to go through the glass envelope of the dewar, the use of Kovar as a conductor material is indicated. The reason for this is that Kovar readily forms an oxide coating which bonds firmly to glass, and is used as the interconnect material because of its matched thermal expansion to that of glass and because of its relatively low heat load across the thermal interface. The latter property makes it desirable to use Kovar for the entire lead run from the detector plane to the base of the dewar because the exclusive use of Kovar substantially reduces the heat leak along the leads, as compared to prior art devices. Use of a Kovar leadframe configuration permits the number, spacing and cross section of individual leads to be tailored to the application.

Kovar leadframes of the size encountered in the abovediscussed type of infrared dewars warp or deform easily and oxidize severely in the presence of air while being bonded to glass at high temperatures. In a production environment, it has long been considered impractical to produce leadframes longer than two or three centimeters at the most. Consequently, it has been the general practice throughout the industry in the prior art to use Kovar leads only for the penetration of the glass wall of the dewar envelope. The stem surface inside the envelope was provided with conductors of another type, which were applied in a separate operation and were individually connected to the Kovar leads. For example, in one technique, the stem surface inside the envelope is coated with a vacuumdeposited layer of noble metal, and laser scribing techniques were used to transform the continuous noble metal surface into individual leads.

The problem with the prior art approach was that it was not only delicate, cumbersome, expensive, and subject to excessive heat leaks, but that it also required two junctions for each lead within the envelope (one junction between the sensor's lead wire and the noble metal lead, and another between the noble metal lead and the Kovar lead), thereby reducing the reliability of the finished product. The reliability of the prior art product was further reduced because the laser-scribed unreinforced portion of the stem was more vulnerable to breakage.

PRIOR ART

Besides the prior art techniques mentioned above and discussed in detail herein, the following U.S. Pat. Nos. are of secondary interest: 3,244,921 (Behun); 3,384,400 (Sandhagen); 4,004,173 (Rigden); and 4,341,955 (Mulder). These references disclose various types of electronic vacuum devices of generally cylindrical shape with electrical connections to the outside world, but they do not address the problem involved in this invention.

SUMMARY OF THE INVENTION

The present invention makes possible a rugged, efficient construction for an infrared detector dewar exhibiting greatly improved reliability at a substantial cost saving. The invention recognizes the advantages of extending a continuous set of Kovar leads all the way along the stem from the detector plane to the outside world at the base of the stem, thus providing a simple and reliable interconnect.

Specifically, the invention teaches the encapsulating of a Kovar leadframe in a relatively long glass conduit by vacuum-sandwiching the leadframe between two concentric glass tubes and fusing the two tubes together while the leadframe is subjected to axial tension. The fused glass conduit (which becomes the stem of the dewar) can then be cut and etched to expose at each of its ends individual Kovar leads which have been protected from undue oxidation by virtue of having been fully encased in glass during the fusion process. The thus exposed ends of the Kovar leads can readily be gold plated by conventional techniques to permit the ready connection of other leads to them.

DESCRIPTION OF THE PREFERRED EMBODIMENT

Figure 1:
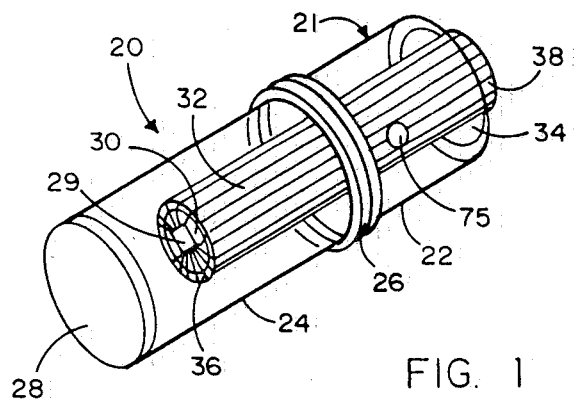
FIG. 1 is a perspective view of the detector dewar of this invention.

The device to which the present invention relates is best shown in FIG. 1. That figure shows an infrared detector dewar 20 of generally conventional construction. The dewar 20 includes an envelope 21 consisting of a glass bell 22 and a glass cover 24 which are permanently connected in an air-tight manner by a fusion ring 26. The cover 24 is provided with a window 28 of a material (e.g. germanium) which is highly transparent to infrared radiation.

Inside the envelope 21, an infrared detector 29 consisting of a focal plane array of sensors is bonded to a detector plane 30 formed by the closed end of a stem 32 which protrudes through the wall of envelope 21 at the base 34 of bell 22. In operation, the detectors are cooled by filling the hollow interior of stem 32 with a cold liquid such as liquid nitrogen, or by the use of a Joule-Thompson cryostat, or with a cryogenic refrigerator. Because such temperatures would cause immediate frosting of the window 28 when exposed to air, and insufficient cooling for proper detector performance, a high vacuum is drawn inside the envelope 21 to thermally insulate the envelope 21 from the cryogenic environment of detector 29.

Figure 2:
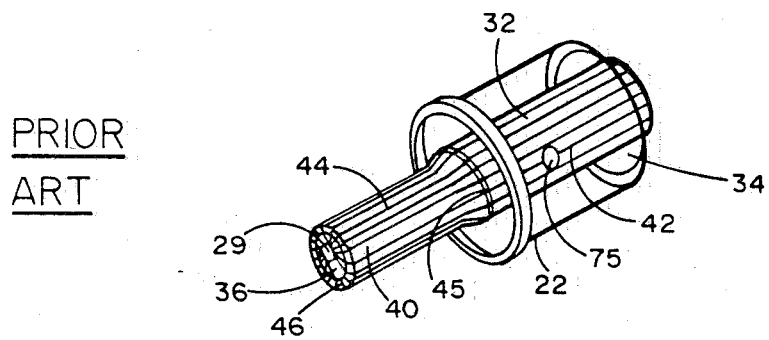
FIG. 2 is a fragmentary perspective view of a portion of a dewar similar to that of FIG. 1 but constructed in accordance with prior art techniques.
Figure 3:
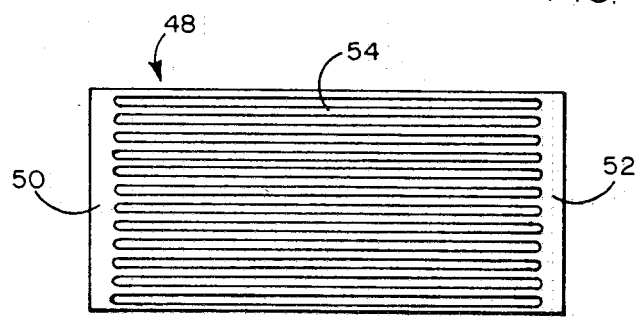
FIGS. 3 through 10 illustrate successive steps in the manufacture of the dewar of this invention.

The problem solved by this invention relates to the manner in which the wire leads 36 of the individual sensors of detector 29 are connected to the outside world at the base 38 of stem 32. In the prior art as illustrated in FIG. 2, short Kovar leads 42 were imbedded in the interface between the stem 32 and the bell 22 at the point where the stem 32 passed through the base 34 of the bell 22. The inner portion 40 of the stem 32, including the inner ends of the short Kovar leads, was then coated with a noble metal, and laser scribing techniques were employed to burn away portions of the noble metal coating so as to form a series of individual noble metal leads 44 bonded at one end 45 to the short Kovar leads 42, and presenting a bondable connection 46 at the other end for attachment of the wire leads 36 of detector 29. This rather complex prior art technique was chosen because no satisfactory manufacturing method could be devised for bringing the Kovar leads 42 all the way to the inner end of conduit 32 without damaging oxidation and without intolerable warpage during the manufacturing process.

The present invention, by providing an improved manufacturing process, makes it possible to extend a unitary set of Kovar leads throughout the entire length of the stem 32, thus saving the complex plating and scribing operations of the prior art and improving the reliability of the finished product by eliminating the connecting joints between the noble metal leads 44 and the Kovar leads 42. In addition, the all-Kovar construction of this invention reduces heat leakage along the leads and provides structural reinforcement for the stem to make it considerably more rugged. The inventive structure and method will best be understood by an examination of FIGS. 3 through 12.

The fabrication of the device of this invention is begun by conventionally photoetching a leadframe 48 (FIG. 3) from a flat sheet of Kovar. The leadframe 48 consists of end pieces 50, 52 between which extend a large number of integrally formed thin Kovar leads 54.

Because the leads 54, in a typical embodiment of the invention, are not much thicker than a human hair, and are positioned quite close together, the leadframe 48 is very sensitive to warpage, particularly when subjected to elevated temperatures.

Figure 4:
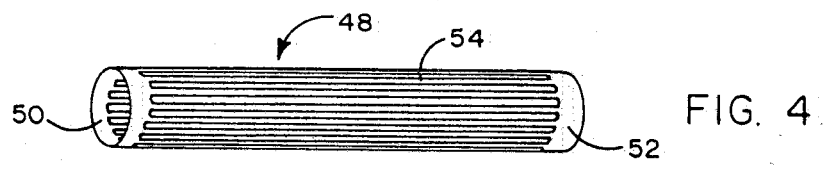

As shown in FIG. 4, the leadframe 48 is next carefully rolled into a tubular configuration of approximately the diameter which it will have in the completed product. The rolling of the tubular leadframe 48 is best carried out in an appropriate forming jig (not shown) of conventional construction.

When the leadframe 48 has been formed into the tubular shape of FIG. 4, it is slipped over a glass tube 56 (FIG. 5) which will constitute a portion of the stem 32. The glass tube 56 is closed at its inner end 58 to form the portion of the stem which, after cutting, will eventually constitute the detector plane 30. When the glass tube 56 has been positioned inside the leadframe 48, the end piece 52 of leadframe 48 is secured to the end 58 of glass tube 56 by any conventional method. At this point, the end piece 50 of leadframe 48 extends beyond the confines of the glass tube 56.

Figure 5:
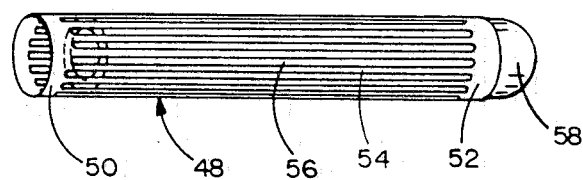
Figure 6:
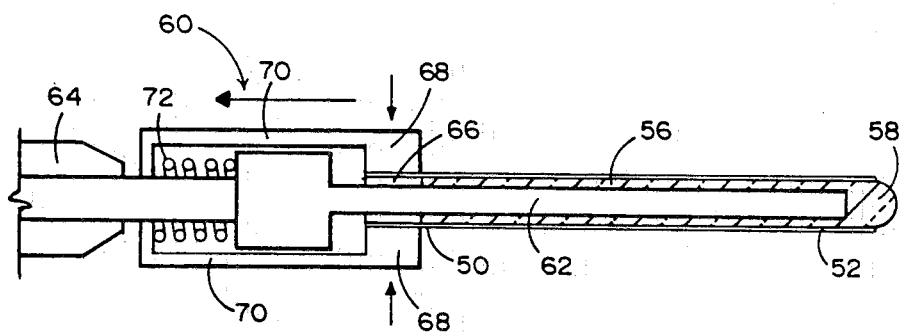
Figure 7:
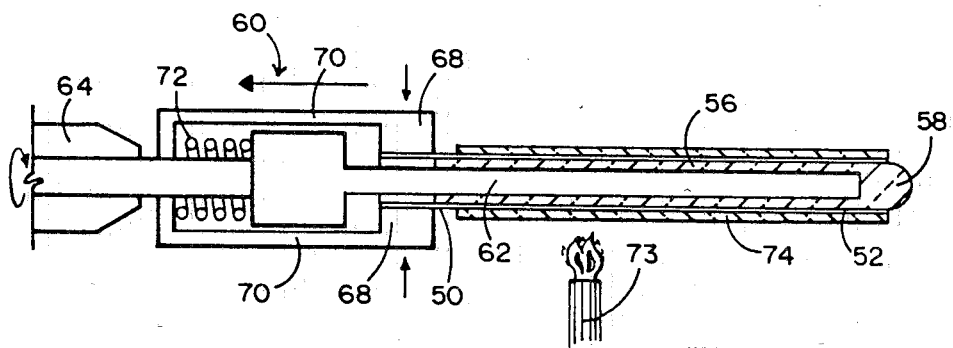

The assembly of FIG. 5 is next inserted into a tension jig 60 best shown in FIG. 6. The tension jig 60 has a mandrel 62 adapted to be inserted in the jaws 64 of a lathe. The glass tube 56 is slipped over the end of the mandrel 62 in such a way as to cause the end piece 50 of leadframe 48 to lie around sleeve 66 which is freely slidable on the mandrel 62. An appropriate apparatus, shown only schematically in FIG. 6, is used to clamp end piece 50 against sleeve 66. In the schematic representation of FIG. 6, clamping jaws 68 are operatively connected to a bracket 70 which is urged away from the tip of mandrel 62 by an appropriate biasing element such as spring 72. Sprin9 72 thus pulls clamping jaws 68, end piece 50, and sleeve 66 to the left in FIG. 6 along the surface of mandrel 62.

While the assembly of FIG. 5 is thus placed on jig 60 with longitudinal tension being applied to the leadframe 48, a second glass tube 74 (FIG. 7) is slipped over the leadframe 48. While tension continues to be applied to the leadframe 48 by spring 72, the glass tube 74 is subjected to a heat source 73, while the lathe jaws 64 are rotated, to fuse the glass tubes 56 and 74 together. The fusion of the two glass tubes is improved by the use of conventional vacuum forming techniques (not shown). The continuing application of tension to the leadframe 48 during the fusion process maintains the leads 54 of the leadframe 58 straight and parallel and is important to the successful manufacture of the dewar of this invention.

Because of the insulation of the leadframe 48 by the glass tube 56, leads 54 do not become excessively oxidized during the fusion process, which prevents poor quality contacts when other leads are connected to the Kovar leads.

Figure 8:
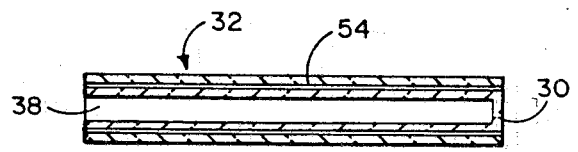

After the glass tubes 56 and 74 have been fused together, the ends of the tubes and of the leadframe 48 are cut off as shown in FIG. 8. The leadframe 48 is thereby converted to a large plurality of parallel glass-enclosed individual Kovar leads 54 which extend all the way from the pedestal detector plane 30 to the base 38 of stem 32.

Figure 9:
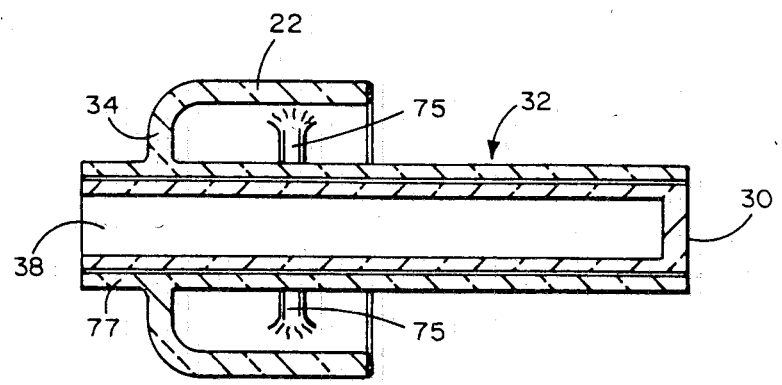
Figure 10:
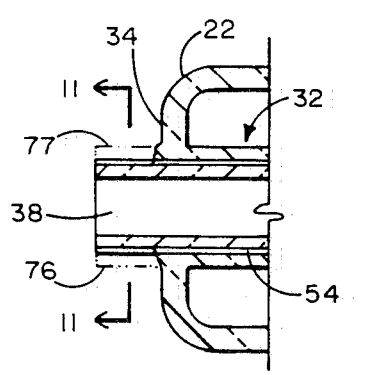
Figure 11:
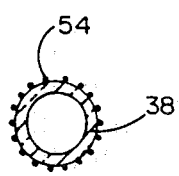
FIG. 11 is a transverse section through the completed stem along line 11—11 of FIG. 10.

As shown in FIG. 9, the base 34 of bell 22, and its reinforcing supports 75, can now be attached to the stem 32 and fused with it without causing oxidation of the leads 54. After the bell 22 has been attached, the radially outward portion 77 of the base 38 of stem 32 can be ground and etched away to expose the Kovar leads 54, as best shown in FIGS. 10 and 11. The thus exposed ends 76 can now be gold plated in accordance with conventional techniques, and electrical leads can be attached to them in accordance with known techniques to suit the particular purpose for which the dewar tube 20 is to be used.

Figure 12:
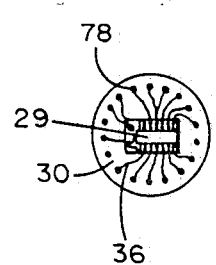
FIG. 12 is an end view of the stem as indicated by line 12—12 of FIG. 10, with the sensor array in place on the detector plane.

The exposed ends 78 of leads 54 are also gold plated, the detector 29 is placed onto the detector plane 30, and its wire leads are then bonded to the gold-plated inner ends 78 of leads 54 as best shown in FIG. 12.

Finally, the cover 24 can be slipped over the sensor 29 and bonded to the bell 22 at fusion ring 26 (FIG. 1). The air-tight envelope 21 can then be evacuated and sealed by conventional techniques to form the completed dewar 20.

It will be seen that the all-Kovar type dewar constructed in accordance with the present invention, as described above, is a simple, efficient, reliable, and rugged device particularly suited to the cryogenic environment in which the infrared detector 29 needs to operate.

What we claim is:

1. A method of making an infrared detector dewar with unitary leads, comprising the steps of:
   (a) providing a first hollow glass tube;
   (b) providing a leadframe consisting of a plurality of elongated electrically conductive leads connected together at their ends;
   (c) positioning said leadframe to lie around said first glass tube so that the leads are disposed generally parellel to the axis of said first tube;
   (d) sliding a second hollow glass tube over said first glass tube and leadframe;
   (e) applying tension to said leadframe in a direction axial of said tubes;
   (f) fusing said tubes together substantially throughout their common length;
   (g) cutting off the ends of said leadframe and tubes to form a stem generally in the shape of a cylinder comprising a plurality of individual glass-encased leads extending axially the entire distance between opposing first and second ends of said cut fused tubes;
   (h) placing an infrared detector onto the first, generally planar, end of the stem, and, in the plane of said first end, bonding conductors emanating from the detector to glass-encased first tips of said leads; and
   (i) placing said stem and detector within an evacuated enclosure such that the first end of the stem is within the enclosure and the second end of the stem is outside of the enclosure.

2. The method of claim 1, in which said leadframe positioning step includes the step of preforming said leadframe to a tubular shape generally corresponding to the outer surface of said first tube.

3. The method of claim 1, in which said leadframe consists of Kovar.

* * * * *